United States Patent [19]
Da Silva et al.

[11] Patent Number: 5,811,362
[45] Date of Patent: Sep. 22, 1998

[54] PROCESS FOR PREPARING A ZIEGLER-TYPE SPHERICAL CATALYST FOR ALPHA-OLEFIN POLYMERIZATION PROCESS

[75] Inventors: Jaime Correia Da Silva; Cecilia Maria Ooelho De Figueiredo, both of Rio de Janeiro, Brazil

[73] Assignee: Petroleo Brasileiro S.A.-Petrobras, Rio de Janeiro, Brazil

[21] Appl. No.: 972,740

[22] Filed: Nov. 18, 1997

Related U.S. Application Data

[63] Continuation of Ser. No. 704,235, Aug. 28, 1996, abandoned, which is a continuation of Ser. No. 222,916, Apr. 5, 1994, abandoned.

[30] Foreign Application Priority Data

Apr. 5, 1993 [BR] Brazil ..................................... 9301438

[51] Int. Cl.⁶ ..................................................... B01J 35/08
[52] U.S. Cl. ........................... 502/9; 423/420.2; 423/422; 423/628; 423/630; 502/351; 502/355; 502/415; 526/352
[58] Field of Search ................................ 423/420.2, 422, 423/628, 630; 502/9, 351, 355, 415

[56] References Cited

U.S. PATENT DOCUMENTS

| | | | |
|---|---|---|---|
| 3,135,809 | 6/1964 | Bosmajian | 260/650 |
| 3,627,684 | 12/1971 | Pistor | 252/99 |
| 4,465,782 | 8/1984 | McKenzie | 502/104 |
| 4,508,841 | 4/1985 | Onmuna et al. | 502/73 |
| 4,628,040 | 12/1986 | Green et al. | 502/9 |
| 4,806,513 | 2/1989 | McDaniel et al. | 502/107 |
| 4,876,321 | 10/1989 | Lo et al. | 526/129 |
| 4,983,693 | 1/1991 | Haag et al. | 526/124 |
| 5,142,077 | 8/1992 | Martin et al. | 554/76 |
| 5,266,666 | 11/1993 | Kamiishi et al. | 526/125 |

FOREIGN PATENT DOCUMENTS

| | | |
|---|---|---|
| 8005302 | 7/1984 | Brazil . |
| A-0 243190 | 10/1987 | European Pat. Off. . |
| 0252804 | 1/1988 | European Pat. Off. . |
| 0468070 | 1/1992 | European Pat. Off. . |
| 2071111 | 9/1971 | France . |
| A-54-104493 | 8/1979 | Japan . |
| A-5-293378 | 11/1993 | Japan . |

OTHER PUBLICATIONS

Database WPI, Section Ch, Week 8809, Derwent Publications Ltd., London, GB; Class C, An 88–061009 for JP–A–63–17220 (Mitsubishi chem) 25 Jan. 1988.
Database WPI, Section Ch, Week 9346, Derwent Publications Ltd., London, GB; Class C, AN 93–364938 for JP–A–5–270819 (Mitsubishi Chem) 19 Oct. 1993.
Chemical Abstracts 103, 54496e, 1 p. (1983).
Polymer Preprints, vol. 24, No. 1, Mar. 1983, pp. 112–113.

*Primary Examiner*—David W. Wu
*Attorney, Agent, or Firm*—Sughrue, Mion, Zinn, Macpeak & Seas, PLLC

[57] ABSTRACT

A proces for preparing a spherical support for the polymerization of alpha-olefins from an ammonium dawsonite which is spray-dryed and formed into spherical particles which are then calcined and impregnated with titanium to produce a spherical catalyst of good mechanical strength is described. Also described is the polymerization process which, in the presence of the spherical catalyst, yields polyolefin particles which preserve the spherical characteristics of the support, with low flow angle and good bulk density, as well as the product polyethylene obtained from the process.

4 Claims, 2 Drawing Sheets

PROCESS FOR PREPARING A ZIEGLER-TYPE SPHERICAL CATALYST FOR ALPHA-OLEFIN POLYMERIZATION PROCESS

This is a Continuation of application Ser. No. 08/704,235 filed Aug. 28, 1996, now abandoned, which is a Continuation of application Ser. No. 08/222,916 filed Apr. 5, 1994, now abandoned.

BACKGROUND OF THE INVENTION

The present invention refers to a process for preparing a catalyst for the polymerization of alpha-olefins under low pressure using a Ziegler-Natta catalyst system, as well as to the spherical catalyst so obtained and to the process for preparing spherical polyethylene of ultra-high molecular weight in the presence of such catalyst. More specifically, the present invention refers to the process for preparing a spherical catalyst support, the characteristics of the support being such that the spherical shape as well as the high mechanical strength are preserved during drying, calcination and impregnation so as the catalyst prepared from the support as well as the ultra-high molecular weight polyethylene prepared from the catalyst system preserve the support spherical shape, which causes better flow properties as well as other morphological properties of the polyethylene.

PRIOR ART

In using Ziegler-Natta as catalysts for producing polymers, there is a continuous need for techniques which would lead to better processing, higher bulk density and use of lower amounts of antioxidant in the shelf, these aspects being linked to the morphology of the product polymer.

The concern with the control of the polymer morphology has been the object of numerous fundamental studies as well as of the practical, industrial and therefore patentable consequences which derive therefrom Thus, French patent FR 2,071,111, owned by Solvay, teaches that supported catalysts allow for the absolute control of the polymer morphology, the morphologies of the support and the polymer being linked. This can be stated in the case where the support has the shape of a microsphere, the polymer obtained having the shape of small spheres, as set forth in French patent 1,550,186. In FR 2,071,111, a metal halide of Groups IV, V and VI of the Periodical Table in its maximum valence state is reduced on a support by means of an organic compound such as an aluminum alkyl, the support being previously impregnated with one of the reagents which make up the catalyst, in the liquid state while introducing the impregnated support into the other reagent which is found either pure in the liquid state, either dissolved in a solvent. It is alleged that a correct kind of support for the objectives of the patent are the so-called "cenospheres" which are made up of porous spheres of diameter between 50 and 250 microns, each sphere being a collection of units of diameter between 0.2 to 2 microns. Thus, while the external shape of the cenosphere determines the morphology of the polymer produced with the aid of the supported catalyst, it could equally be seen that the elementary particles which constitute the cenosphere are regularly spread on the polymer. These particles can act as nucleating centers when the polymer crystallizes. There is a comment in this reference that due to the fact that the polymer formed is an increased image of the support, the cenosphere granulometry is reflected on the granulometry of the polymer beads and consequently influences the bulk density of the polymer Normally, a high bulk density is sought which is obtained from a support of wide distribution of particle sizes, especially a bimodal distribution, maxima being found at 55 microns and 125 microns. The morphology and bulk density of the support are equally monitored by the choice of the support, which makes possible to reach slurries of high densities during polymerization while the particle size of the polymer which exits the polymerization vessel is such that it does not require granulation. As a consequence of the effect of the support, a high activity, good morphology catalyst is produced. The described catalysts are useful in the polymerization or co-polymerization of all alpha-olefins.

A. Munoz-Escalona, in an article published in the Polymer Preprints of the American Chemical Society, Division of Polymer Chemistry, 24(1), 112–13(1983), states that the catalyst support, more than the polymerization technique, controls the morphology of the polymer particles obtained through supported Ziegler-Natta catalysts. In another article by A. Munoz-Escalona and A. Sierraalta, published by the Acta Cient. Venez. 34 (3–4), p. 203–8 (1983), the authors teach that in the ethylene polymerization catalyzed by $Et_2AlCl$—$TiCl_4$ the Al/Ti ratio is the most important factor affecting the morphology of produced polyethylene, an increase of this ratio causing an increase in the crystallinity and the density as well as an increase in the particle size of the polymer. As the Al/Ti ratio increases the bulk density also increases while the molecular weight is reduced.

EP 252804 describes catalysts the morphology of which is preserved during polymerization. This patent teaches that ethylene is polymerized on spherical catalysts which contain transition metals, magnesium compounds as well halides up to an adequate degreee of polymerization, the catalyst being then treated with the aluminum compounds to stabilize the spherical morphology. In EP 468070 (corresponding to Japanese patent JP 221112) in the name of J. Kano et al., entitled "Process for Preparing Spherical Silica Gel", a method is described for preparing spherical silica gel wherein the amount of water present in the paste is adjusted to be of from 0.2 to 1.5 times the weight of silica hydrogel, in the process for preparing spherical silica gel during the spray drying of the paste of silica hydrogel and water. The silica hydrogel paste is obtained by reaction of the alkali metal silicate salt and mineral acid followed by humid granulation of the hydrogel silica, the pH of the silica hydrogel being in the range of from 1 to 3. Although it is alleged that the obtained spherical silica is adequate as catalyst support, no significant example of the produced silica as catalyst support is provided. In Brazilian patent PI BR 8005302, of the Applicant and hereby fully incorporated as reference, is described a process for preparing an alumina useful as catalyst support or as a catalyst from the reaction of aluminum sulfate and ammonium bicarbonate at 15°–20° C., the pH being maintained between 7.5 and 7.7 through the addition of ammonium hydroxide, to produce the precursor ammonium dawsonite, which contains of from 10 to 20 weight % of residual sulfate ions. The calcination of the ammonium dawsonite at 600°–800° C. for 4–10 hours yields an alumina of surface area 200–400 $m^2/g$, pore volume 1.5 to 3.5 $cm^2/g$ and where 85% of the pores are greater than 100 A. In order to avoid sulfate losses, the precursor ammonium dawsonite is not washed prior to calcination.

In U.S. Pat. No. 4,983,693, corresponding to Brazilian patent 8707098, of the Applicant and herein fully incorporated by reference, a catalyst for the polymerization of alpha-olefins is described which is obtained by impregnating the alumina taught in Brazilian patent 8005302 with of from 0.8 to 1.0 weight % of titanium from titanium halide in n-hexane, activated by triisobutyl aluminum or triethylaluminum, the molar ratio of Al/Ti in the catalyst being 15/1 up to 60/1. The thus obtained polyethylene has ultra-high molecular weight and is used as an engeneering plastics in view of its outstanding mechanical properties, chiefly high impact and abrasion strength as well as high tensile strength. However, the polyethylenes obtained through such a process show a drawback as regards their morphological properties, that is, particles are irregular and of low bulk density (0.25 to 0.30 g/cm$^2$). Additives can be added to the polymers to increase their bulk density; however, this practice increases cost as well as impurities in the finished product. The irregular morphology of the polymer particles produced according to the process of U.S. Pat. No. 4,983,693 necessarily causes fluidity problems which reflect directly on the polymer processing and storage. Besides, irregular polymer particles require higher antioxidant amounts—nearly toxic—which severely limits its use in the food industry.

In pressing morphologically irregular polymers, dificent flow and packing cause air bubbles in the pressed items, which then show inferior abrasion strength.

Thus, it can be seen that, in spite of the existence of numerous academic studies on the morphology of catalyst supports, the catalysts made from those supports and their influence on the produced polymer, as well as patents which suggest the use of spherical supports as being able to convey the spherical shape to the polymer (replication phenomenon), the scientific literature has not yet published nor suggested a process or a support for a Ziegler catalyst which would be easily prepared by the industry in spherical shape, and which after calcination and impregnation keeps mechanical properties intact, chiefly good wear strength, so as to convey to the polymer the replication phenomenon. The replication phenomenon causes that the support or catalyst conveys to the polymer its own morphology, the product showing then optimum characteristics as regards bulk density and molecular weight, with low requirements in anti-oxidant.

SUMMARY OF THE INVENTION

One objective of the invention is a spherical catalyst support based on ammonium dawsonite which is able, by meant of the replication phenomenon, to convey its morphological properties to the catalyst as well as to the produced polymer.

Another objective is a spherical support which is prepared by the spray-drying of the ammonium dawsonite slurry, the morphological properties of which are preserved in the catalyst and fully conveyed to the produced polymer, which will then show optimum properties as concerns bulk density and flow, while keeping at a minimum the need of anti-oxidant additives.

Still another objective is a spherical, easily processable polyolefin powder, which requires low or no amounts of additive for improving bulk density and oxidation resistance.

These objectives are attained by using a well-known technique—spray-drying—on an active support, of high surface area, which leads to a spherical product of new features, which, through the replication phenomenon, have been conveyed to the product polymer, of excellent morphology.

Figure 1:
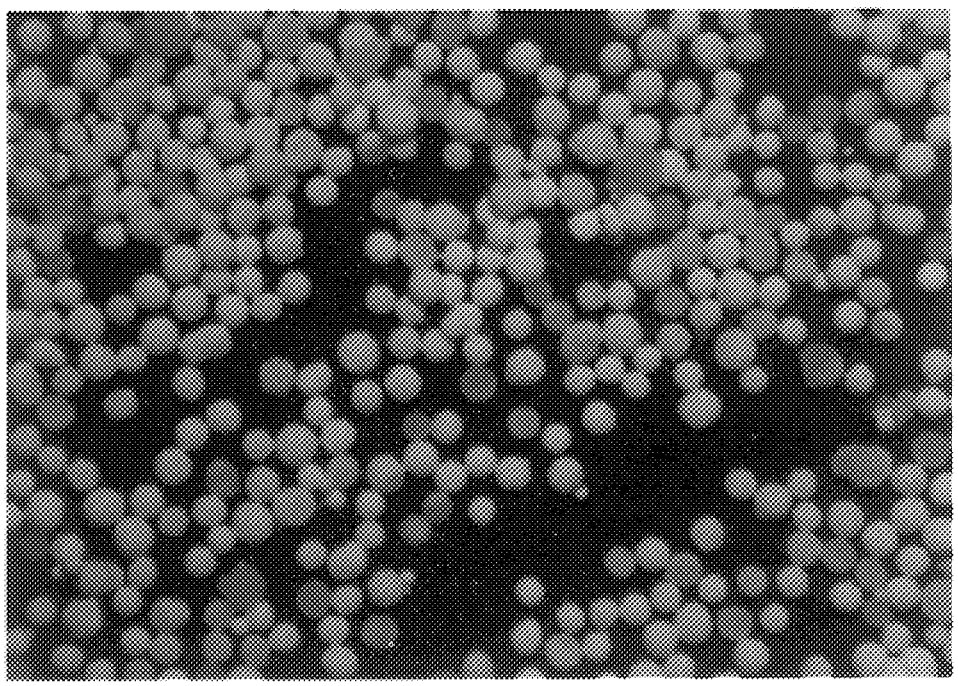
FIG. 1 is a picture taken at the microscope of a spherical polyethylene of the invention, magnification being 8 times.
Figure 2:
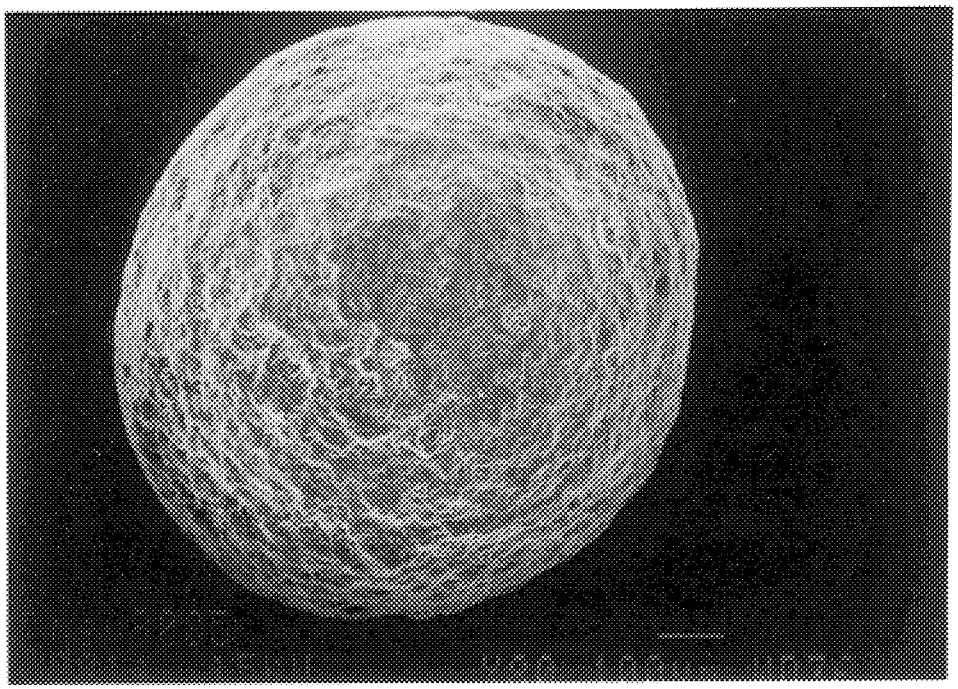
FIG. 2 is a picture of the same polymer of FIG. 1, the magnification being 80 times.
Figure 3:
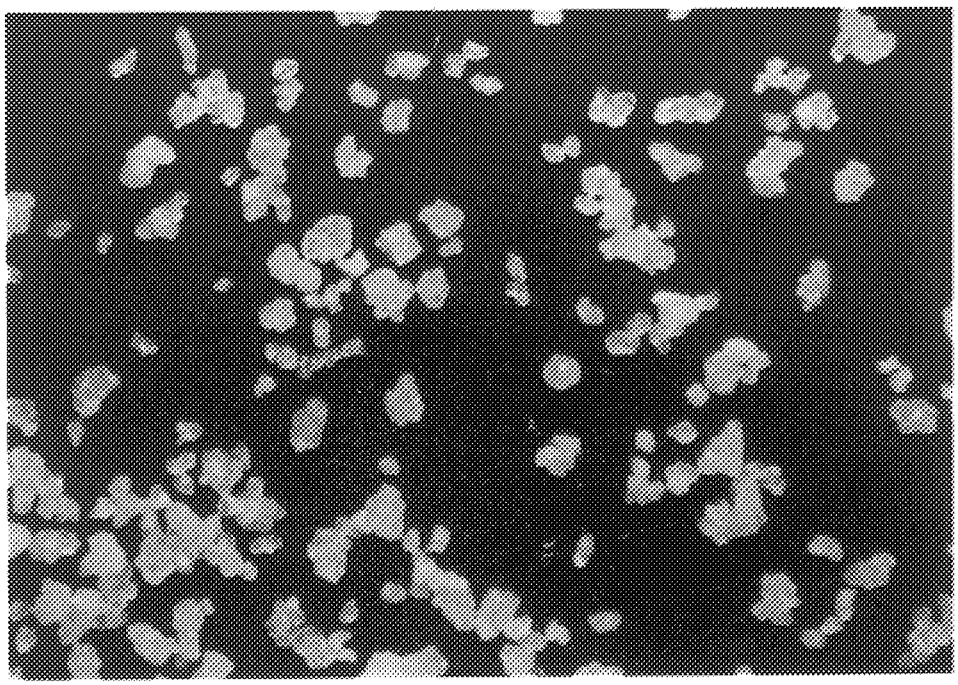
FIG. 3 is a picture of a comercial polyethylene, the magnification being 10 times.
Figure 4:
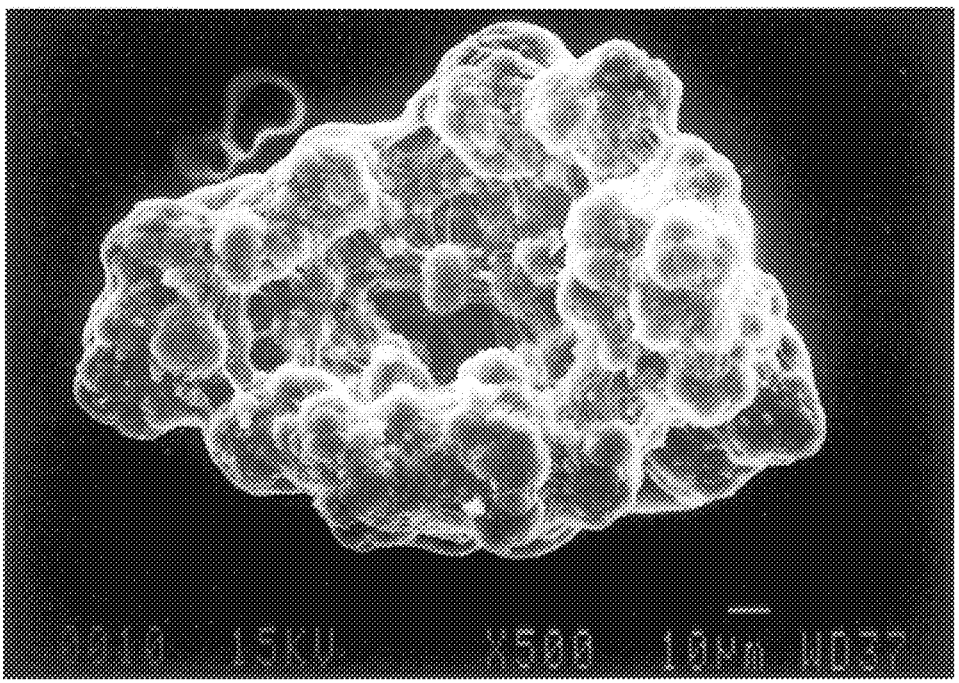
FIG. 4 is a picture of the same commercial polyethylene of FIG. 3, the magnification being 500 times.

By examining the attached Figures it can be seen that the morphologies of the polymers are completely different, this having direct consequences on the physical properties of the product polyethylenes.

PREFERRED MODE—DETAILED DESCRIPTION

In preparing the present support and catalyst, various materials can be used to synthesize the precursor ammonium dawsonite, as described in Brazilian patent BR 8005302. In using the best mode to perform the present invention, an aqueous solution of commercial aluminum sulfate at 216 g/l and an aqueous solution of commercial ammonium bicarbonate at 230 g/l are made to react at 15°–20° C., the pH being controlled between 7.5–7.7 by adding ammonium hydroxide so as to obtain the ammonium dawsonite containing of from 10 to 20% by weight of residual sulfate ions. In order to preserve the sulfate ions, the precursor should not be washed. The dawsonite aqueous solution is filtered and the resulting filter cake is resuspended in water so as to obtain a slurry the concentration of which is between 8.0 and 10.0 weight %. This slurry is then directed to a spray-dryer of 200 kg/hour of evaporation capacity, the liquid product being spray-dryed by means of a rotating disk. The entrance conditions into the spray-dryer are: entrance temperature of from 350°–450° C., exit temperature 130°–150° C., disk speed between 10000 and 14000 rpm, flowrate of from 3.0 to 4.0 kg/minute. Spray-drying yields support spherical particles of mean diameter between 38 to 61 microns. If particles of lower diameters are desired, either the dawsonite slurry concentration or the spray-dryer rotation speed is reduced. The dryed dawsonite is placed in a quartz tube in a horizontal furnace and heated to 600°–700° C. for 4 to 6 hours. After calcination the alumina is transferred to a one liter capacity vessel. The gamma-alumina obtained after calcination shows surface area between 150–250 m$^2$/g and pore volume of from 1.0 to 2.0 ml/g. On this gamma-alumina are impregnated of from 0.5 to 1.0 weight % of titanium as the halide in n-hexane, as described in U.S. Pat. No. 4,983,693, of the Applicant, herein fully incorporated by reference, and the temperature is increased to 140°–160° C., this temperature being kept as such for one hour while the whole system is under agitation.

The low-pressure polymerization is effected following the general procedure outlined in Brazilian patent PI 8707098, ethylene pressure being of from 14 to 20 kgf/cm$^2$. In case of alpha-olefins or copolymers, the process conditions are adapted so that, for the specific kinetic and thermodynamic conditions, can be obtained the desired polyolefin or spherical copolymer.

Therefore, the process for preparing the spherical catalyst according to the present invention comprises the following steps:

A) Spherical support
a) in a centrifuge, filter an aqueous slurry of ammonium dawsonite prepared from an aqueous solution of aluminum sulfate and an aqueous solution of ammonium bicarbonate at pH 7.5–7.7, and resuspend in water the filter cake so as to obtain a slurry of concentration between 8.0 to 10.0 weight %;

b) feed the slurry of step a) in a spray-dryer at a flowrate of 3.0 to 4.0 kg/minute, the entrance temperature in the spray-drier being of from 350° to 450° C. while the exit temperature is of from 130° to 150° C.;

c) dry the spherical ammonium dawsonite prepared in b) the spray-dryer rotating disk operating between 10000 to 14000 rpm;

d) calcine the spherical, dried ammonium dawsonite prepared in c) in a quartz tube placed in a furnace at 600°–700° C. for 4–6 hours, yielding a spherical gamma-alumina of surface area of from 150–250 $m^2/g$ and pore volume of between 1.0 to 2.0 ml/g;

B) Spherical catalyst a) impregnate the gamma-alumina of A)d) with of from 0.5 to 1.0 weight % of titanium as the halide and dissolved in n-hexane at a temperature of from 140°–160° C. which after one hour is reduced to 60°–65° C., the reaction product being washed three times with aliphatic hydrocarbon (n-hexane) and stored in this same hydrocarbon, the final titanium content in the catalyst being of from 0.5 to 1.0 weight %.

For the polymerization of olefins such as ethylene, n-hexane solvent is fed to the polymerization vessel and heated to 80° C., then co-catalyst Al(Et)$_3$ and spherical catalyst are introduced, Al/Ti ratio being of between 15/1 to 60/1. When temperature reaches 85° C., ethylene is fed at a pressure of from 14 to 20 kgf/cm$^2$ for one hour or more, then pressure of the polymerization vessel is alleviated.

The reaction yields spherical ultra-high molecular weight polyethylene. Advantageously, the polyethylene has a bulk density of 0.39 to 0.41 g/cm$^3$, an internal attrition angle of 30° to 40°, a tensile strength of 300 to 440 kgf/cm$^2$, an elongation of 195 to 260%, a Rockwell hardness of 61 to 67, does not flow when subjected to the ASTM D-1238 melt flow index test and does not break when subjected to the ASTM D-256 Izod Impact strength test. The present invention will be now illustrated by the following Examples, which should not be construed as limiting.

EXAMPLE 1

As previously described, an ammonium dawsonite was synthesized which, by working at an entrance temperature in the spray-dryer of 400° C., exit temperature of 150° C. and slurry concentration of 8.3 weight % produced a spherical catalyst support having particles of mean diameter 40 microns. After calcination, at 700° C./5 hours, on this support was impregnated a metal titanium content of 0.55 weight %, as taught in Brazilian patent BR 8707098 (U.S. Pat. No. 4,983,693). Ethylene (14 kgf/cm$^2$) was polymerized in a pilot plant in the presence of this catalyst and Al(Et)$_3$ as co-catalyst, the ratio Al/Ti being 40.2, the polyethylene so obtained having spherical particles of mean diameter 650 microns. The catalytic activity reached 139,037 grams of polymer per gram of titanium per hour, the bulk density of the polymer so produced was 0.39 g/cm$^3$ and in the flow test the internal attrition angle reached 40°. Note that the internal attrition angle is a property of the product polyolefin linked to the morphology, the attrition angle decreasing as the powder flow increases. The definition of the attrition angle can be found in the publication by ZENS, F. A. & OTHMER, D. F.—"Fluidization and Fluid Particle Systems", N.Y. Reinhold Publishing Corporation 1960 p. 75.

Table 1 below lists properties of the catalysts, besides polymerization data as well as of the product polymer for Examples 1, 2, 3 and 4.

TABLE 1

Data from Table 1 show the high catalytic activity of the spherical system, comparable to high performance, non-spherical systems, as well as the high bulk density and low internal attrition angle, which indicate good fluidity and flow of the product polymer.

Table 2 below lists physical chemical data as well physical properties of the polyethylenes prepared according to the present invention. For the sake of comparison are also listed the corresponding properties for non-spherical polyethylenes of U.S. Pat. No. 4,983,693.

Table 2 shows that the good mechanical properties of the polyethylenes of U.S. Pat. No. 4,983,693 have been preserved through the present process, while bulk density and internal attrition angle have been improved, which greatly favors processing.

TABLE 1

| Ex. no. | Support Mean Diameter (microns) | Ti cont. (%) | Al/Ti ratio | PE Mean Diameter (microns) | Cat. Activity gPE/gTi h |
|---|---|---|---|---|---|
| 1 | 40 | 0.55 | 40.2 | 650 | 139.037 |
| 2 | 40 | 0.55 | 38.0 | 530 | 102.930 |
| 3 | 40 | 0.55 | 30.0 | 680 | 238.461 |
| 4 | 40 | 0.69 | 28.0 | 650 | 185.000 |
| Non Spher. | 30 | 0.80 | 20.0 | 300 | 150.600 |

TABLE 2

| EX. | Actual Density ASTM D-1601 | Tensile Strength ASTM-D-638 | Elongation ASTM-D-638 (%) | Rockwell Hardness ASTM-785 (R) | bulk Density ASTM-1895 | Internal Attrition Angle |
|---|---|---|---|---|---|---|
| EX. 1 | 0.9357 | 400–440 | 220–250 | 64–66 | 0.39 | 40° |
| EX. 2 | 0.9352 | 350–400 | 195–240 | 65–67 | 0.39 | 40° |
| EX. 3 | 0.9370 | 330–420 | 220–260 | 65–67 | 0.41 | 30° |
| EX. 4 | 0.9369 | 300–400 | 200–230 | 60–62 | 0.41 | 30° |
| Non spher. | 0.9350 | 370–490 | 250–330 | 70–75 | 0.32 | 60° |

Notes:
1) In ASTM Method D-1238: Melt Flow Index in g/10 minutes, the polymer does not flow, which means molecular weight higher than 4.5 millions.
2) In STM Method D-256, Izod impact strength in kg.cm/cm, the polymer does not break, due to the extremely high molecular weight exhibited by the polymer.

We claim:

1. A process for preparing a spherical catalyst for the polymerization of alpha-olefins to produce a spherical ultra high molecular weight polyethylene having an internal attrition angle between 30° and 40°, which consists of the following steps:

A) forming a catalyst support by:
  a) obtaining a filter cake by filtering an aqueous slurry of ammonium dawsonite in a centrifuge, the ammonium dawsonite being prepared from the reaction between an aqueous solution of aluminum sulfate and an aqueous solution of ammonium bicarbonate at a pH of from 7.5 to 7.7 such that the dawsonite product retains from 10 to 20 weight % of residual sulfate ions, and then resuspending the filter cake in water to provide a resulting slurry having a concentration between 8.0 and 10.0 weight % on a solid basis;
  b) drying the resulting slurry obtained in a) in a spray-dryer including a rotating disk at a flowrate of from 3.0 to 4.0 kg/minute, while entrance temperature is from 350° to 450° C., exit temperature is from 130° to 150° C. and disk speed is between 10000 and 14000 rpm, so as to produce a spherical, dried ammonium dawsonite;
  c) calcining the spherical, dried ammonium dawsonite obtained in b) in a quartz tube, placed in a furnace at 600°–700° C. for 4 to 6 hours, so as to produce spherical gamma-alumina;

B) forming a spherical catalyst by:
  on the gamma-alumina prepared in A)c), impregnating a solution of titanium halide dissolved in an aliphatic hydrocarbon solvent so as to obtain titanium content as metal incorporated into the catalyst in the range of 0.5 to 1.0% by weight, increasing the temperature up to 140°–160° C., this temperature level being kept as such for one hour while the whole system is under agitation, cooling to 60°–65° C. and washing the spherical catalyst product with aliphatic hydrocarbon.

2. A process according to claim 1, wherein the concentration of the resulting slurry suitable for spray-drying is from 8.3 to 9.4 weight % on a solid basis.

3. A process according to claim 1, wherein the gamma-alumina produced in A) c) has a surface area between 150 and 250 $m^2/g$ and a pore volume from 1.0 to 2.0 ml/g.

4. A spherical catalyst prepared by a process as in claim 1, the catalyst being made up of a spherical gamma-alumina having a surface area from 150 to 250 $m^2/g$, and a pore volume from 1.0 to 2.0 ml/g.

* * * * *